US012676113B2

(12) United States Patent
Iwane et al.

(10) Patent No.: US 12,676,113 B2
(45) Date of Patent: Jul. 7, 2026

(54) LIGHT EMITTING DEVICE, DISPLAY DEVICE, IMAGE CAPTURING DEVICE, ELECTRONIC APPARATUS, AND WEARABLE DEVICE

(71) Applicant: CANON KABUSHIKI KAISHA, Tokyo (JP)

(72) Inventors: Masaaki Iwane, Kanagawa (JP); Takanori Yamashita, Tokyo (JP); Shoji Kono, Tokyo (JP); Shusuke Yanagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/036,263

(22) Filed: Jan. 24, 2025

(65) Prior Publication Data

US 2025/0252923 A1 Aug. 7, 2025

(30) Foreign Application Priority Data

Feb. 7, 2024 (JP) ................................ 2024-017430

(51) Int. Cl.
*G09G 3/3233* (2016.01)

(52) U.S. Cl.
CPC ....... *G09G 3/3233* (2013.01); *G09G 2310/08* (2013.01); *G09G 2330/02* (2013.01)

(58) Field of Classification Search
CPC ............. G09G 3/3233; G09G 2310/08; G09G 2330/02
USPC .......................................................... 345/204
See application file for complete search history.

(56) References Cited

U.S. PATENT DOCUMENTS

| | | | | |
|---|---|---|---|---|
| 9,287,333 | B2 | 3/2016 | Jinta et al. | |
| 2014/0306200 | A1 | 10/2014 | Jinta et al. | |
| 2018/0151646 | A1* | 5/2018 | Kim | H10K 59/122 |
| 2020/0035941 | A1 | 1/2020 | Yoo | |
| 2021/0384280 | A1* | 12/2021 | Akiyama | G06F 1/1626 |
| 2022/0181575 | A1 | 6/2022 | Yun | |
| 2022/0352293 | A1* | 11/2022 | Kim | H10K 59/131 |
| 2023/0061540 | A1 | 3/2023 | Nagasaki | |
| 2023/0099575 | A1 | 3/2023 | Iwane | |
| 2023/0292562 | A1* | 9/2023 | You | H10K 59/124 |
| 2023/0389373 | A1 | 11/2023 | Akiyama | |
| 2023/0389381 | A1 | 11/2023 | Yanagawa | |
| 2024/0431158 | A1* | 12/2024 | Choi | H10K 59/131 |
| 2025/0301878 | A1* | 9/2025 | Yang | H10K 59/80518 |

FOREIGN PATENT DOCUMENTS

| | | | |
|---|---|---|---|
| JP | 2013-105148 | A | 5/2013 |
| JP | 2013-238723 | A | 11/2013 |
| JP | 2014-207105 | A | 10/2014 |
| JP | 2021-067954 | A | 4/2021 |

* cited by examiner

*Primary Examiner* — Mark Edwards
(74) *Attorney, Agent, or Firm* — Venable LLP

(57) ABSTRACT

A light emitting device comprises a plurality of pixels each including a light emitting element and a driving transistor configured to drive the light emitting element; and a power supply wiring configured to supply a power supply voltage to the driving transistor. The light emitting element includes a first electrode, a light emitting layer arranged on the first electrode, and a second electrode arranged on the light emitting layer. At least a part of the power supply wiring is arranged at one of the same height as a bottom surface of the first electrode and a position closer to the second electrode than the height.

13 Claims, 11 Drawing Sheets

LIGHT EMITTING DEVICE, DISPLAY DEVICE, IMAGE CAPTURING DEVICE, ELECTRONIC APPARATUS, AND WEARABLE DEVICE

BACKGROUND OF THE INVENTION

Field of the Invention

One disclosed aspect of the embodiments relates to a light emitting device, a display device, an image capturing device, an electronic apparatus, and a wearable device.

Description of the Related Art

There is a display device including a light emitting device that uses an organic light emitting element. Japanese Patent Laid-Open No. 2013-238723 (to be referred to as PTL 1 hereinafter) describes an electrooptical device in which a power supply wiring surrounds a light emitting element and an intermediate electrode connecting the anode of the light emitting element and a transistor configured to control a current flowing to the light emitting element. According to PTL 1, this can reduce image quality deterioration caused by noise affecting the portion from the region where the transistor is formed to the anode. In a light emitting device, fluctuations of a power supply voltage can generate horizontal stripes in the display.

SUMMARY OF THE INVENTION

According to the present invention, it is possible to provide a technique capable of suppressing the influence of fluctuations of a power supply voltage on the display of a light emitting device.

According to one aspect of the disclosure, there is provided a light emitting device comprises a plurality of pixels each including a light emitting element and a driving transistor configured to drive the light emitting element; and a power supply wiring configured to supply a power supply voltage to the driving transistor. The light emitting element includes a first electrode, a light emitting layer arranged on the first electrode, and a second electrode arranged on the light emitting layer, and at least a part of the power supply wiring is arranged at one of the same height as a bottom surface of the first electrode and a position closer to the second electrode than the height.

Further features of the present invention will become apparent from the following description of exemplary embodiments with reference to the attached drawings.

DESCRIPTION OF THE EMBODIMENTS

Figure 1:
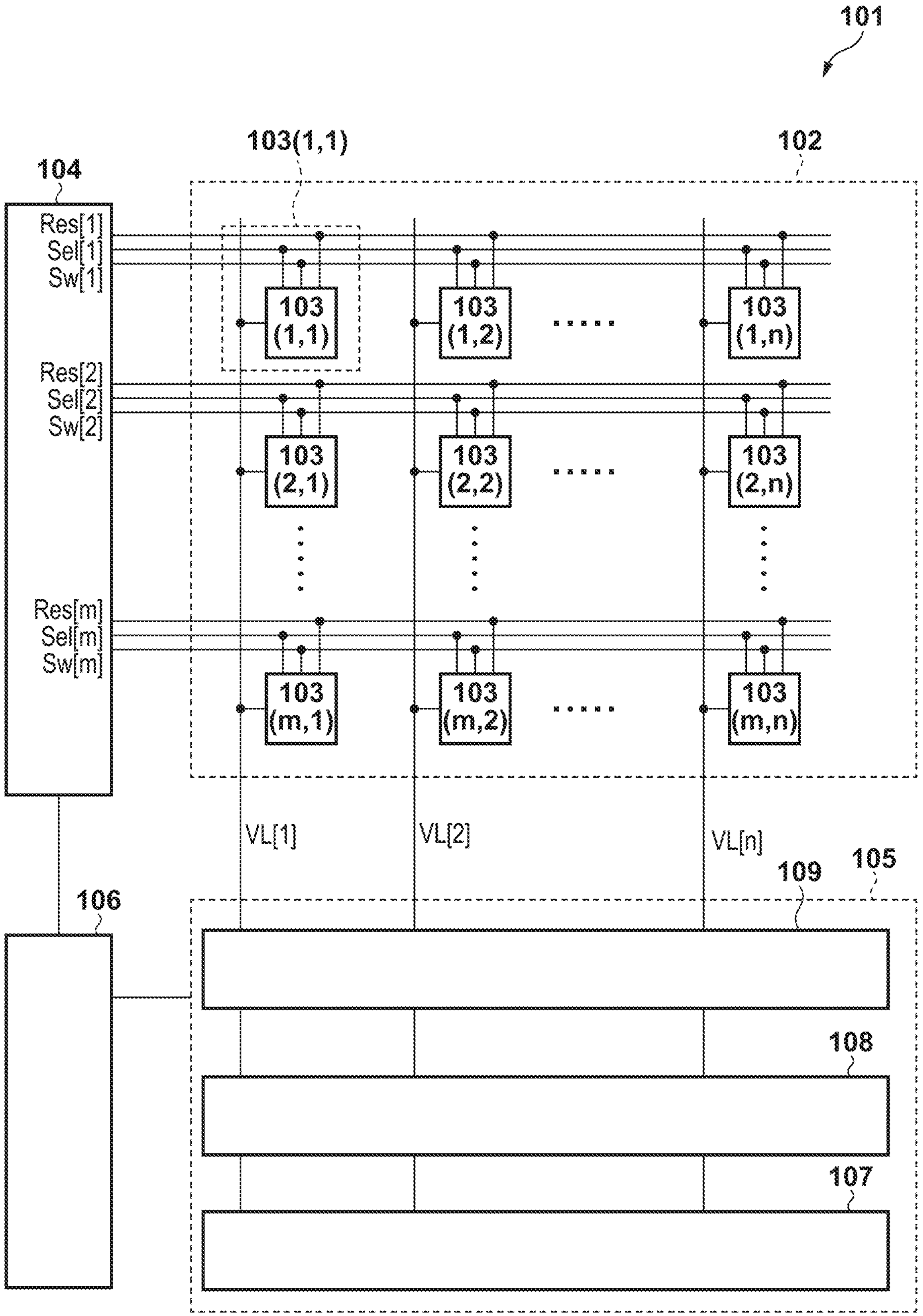
FIG. 1 is a block diagram of a light emitting device according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Alight emitting device using an organic light emitting element (OLE) will be taken as an example and described below. FIG. 1 is a block diagram of a light emitting device 101 according to this embodiment. The light emitting device 101 shown in FIG. 1 includes a pixel array portion 102 and a peripheral circuit of the pixel array portion 102. The pixel array portion 102 includes a plurality of pixels 103(1, 1) to 103(*m, n*) two-dimensionally arranged in a matrix of m rows and n columns. Each of the pixels 103(1, 1) to 103(*m, n*) includes an organic light emitting element.

The peripheral circuit is a circuit for controlling the respective pixels 103(1, 1) to 103(*m, n*), and includes a vertical scanning circuit 104, a signal output circuit 105, and a control circuit 106. The signal output circuit 105 includes a horizontal scanning circuit 107, a column digital-analog conversion (DAC) circuit 108 including a plurality of DAC circuits, and a column driver circuit 109. The column DAC circuit 108 includes DAC circuits for n columns corresponding to the number of columns of the pixel array portion 102. The column driver circuit 109 includes driver circuits for n columns corresponding to the number of columns of the pixel array portion 102.

The horizontal scanning circuit 107 scans the column DAC circuit 108 to input a digital signal input from the control circuit 106 to each DAC circuit of the column DAC circuit 108. The DAC circuit converts the input digital signal into a corresponding analog signal. Each driver circuit of the column driver circuit 109 outputs the analog signal input from the corresponding DAC circuit to corresponding one of signal lines VL[1 to n].

The vertical scanning circuit 104 is connected to the pixel array portion 102 by reset signal lines Res[1 to m], write control signal lines Sel[1 to m], and light emission control signal lines Sw[1 to m].

Figure 2:
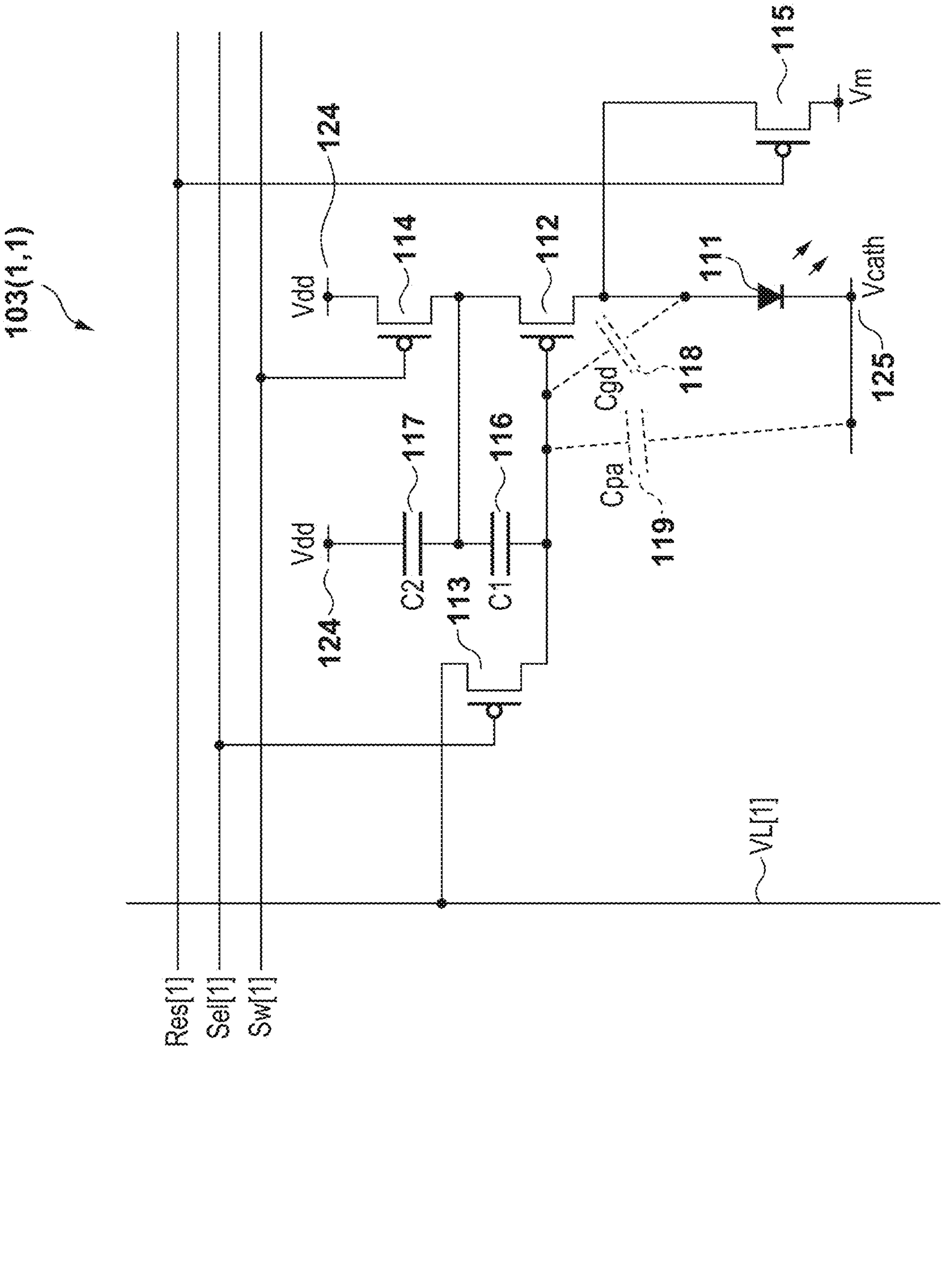
FIG. 2 is a circuit diagram of a pixel according to the first embodiment.

FIG. 2 is a circuit diagram of the pixel 103(1, 1) shown in FIG. 1. The pixel 103(1, 1) includes an organic light emitting element 111, a driving transistor 112, a write transistor 113, a light emission control transistor 114, a reset transistor 115, a first capacitive element 116, and a second capacitive element 117. Each of the first capacitive element 116 and the second capacitive element 117 is typically a capacitance having a Metal-Insulator-Metal (MIM) structure. The driving transistor 112, the write transistor 113, a light emission control transistor 114, and the reset transistor 115 are p-channel MOS transistors. Note that these transistors do not all have to be p-channel transistors, and the conductivity type and the polarity may be combined and used, as appropriate.

The organic light emitting element 111 includes an organic layer including a light emitting layer between an anode and a cathode. The organic layer may include one or some of a hole injection layer, a hole transport layer, an electron injection layer, and an electron transport layer, as appropriate, in addition to the light emitting layer. A cathode electrode 125 shared by all pixels is provided as the cathode of the organic light emitting element 111. A cathode voltage Vcath applied to the cathode electrode 125 is typically −5 V. A parasitic capacitance 118 and a parasitic capacitance 119 are shown. Here, the parasitic capacitance 118 is a parasitic capacitance having a capacitance value Cgd between the gate electrode and the drain electrode of the driving transistor 112. The parasitic capacitance 119 is a parasitic capacitance having a capacitance value Cpa between the gate electrode of the driving transistor 112 and the cathode electrode 125.

The source electrode of the light emission control transistor 114 and one electrode of the second capacitive element 117 are connected to a power supply wiring 124. One electrode of the first capacitive element 116 and the other electrode of the second capacitive element 117 are connected, and the connection point is connected with the drain electrode of the light emission control transistor 114 and the source electrode of the driving transistor 112. The drain electrode of the driving transistor 112 is connected to the anode electrode of the organic light emitting element 111. The cathode electrode of the organic light emitting element 111 is supplied with the cathode voltage Vcath. A power supply voltage Vdd is applied to the power supply wiring 124 connected to the second capacitive element. The power supply voltage Vdd is typically 5 V A voltage Vm applied to the drain electrode of the reset transistor 115 is typically −5 V.

Figure 3:
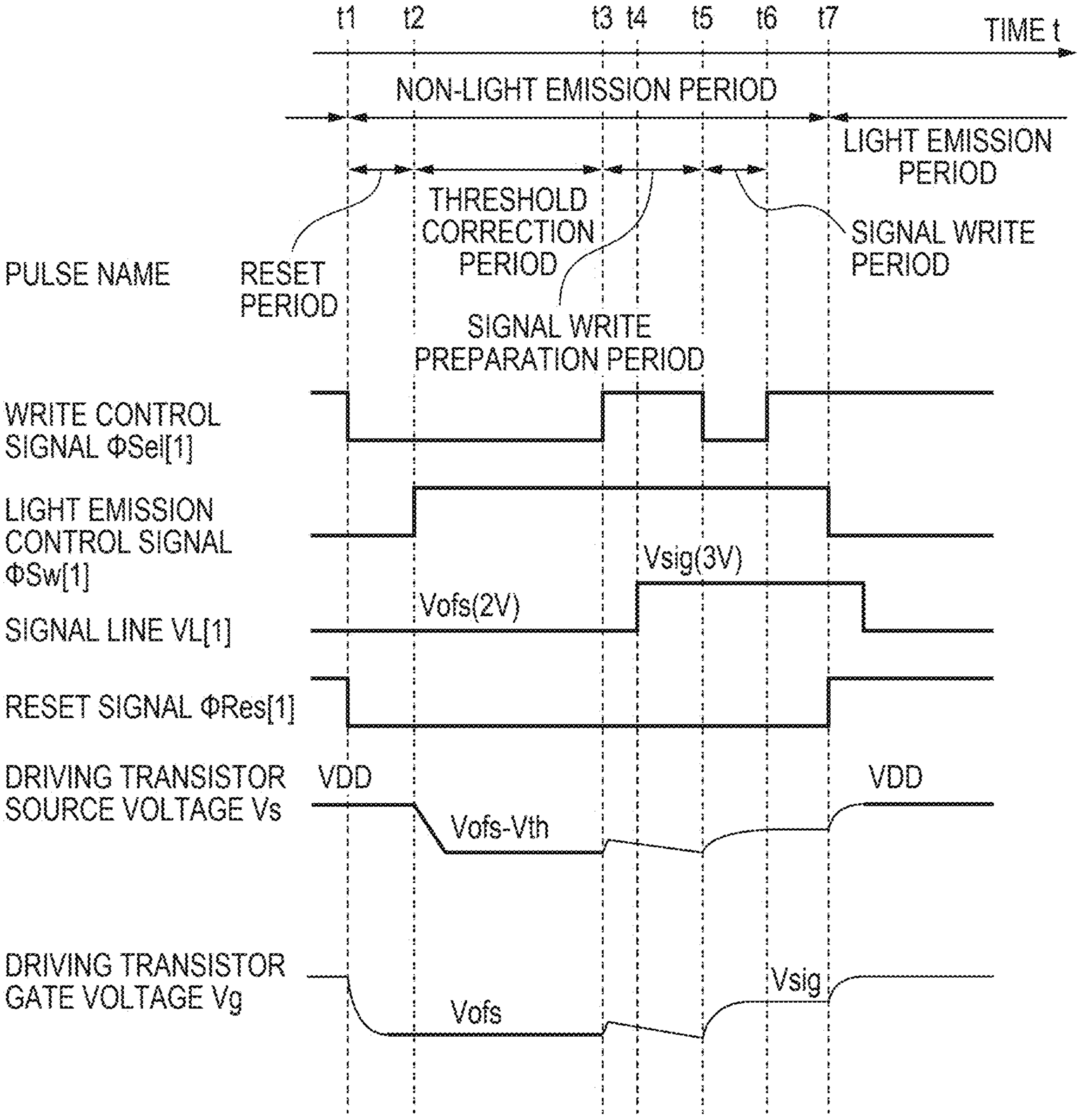
FIG. 3 is a timing chart according to the first embodiment.

Driving of the light emitting element according to this embodiment will be described with reference to the timing chart of FIG. 3. In FIG. 3, the abscissa represents time t. First, at time t1, a write control signal φSel[1] transitions from high level to low level, thereby setting a gate voltage Vg of the driving transistor 112 to a correction voltage (to be referred to as a Vofs hereinafter). The Vofs is typically 2 V. In addition, at time t1, a reset signal φRes[1] transitions from high level to low level. At time t2, a light emission control signal φSw[1] transitions from low level to high level, thereby setting the light emission control transistor 114 in the OFF state. The period from time t1 to time t2 is referred to as a reset period. In the reset period, the gate voltage (to be referred to as the Vg hereinafter) of the driving transistor 112 is initialized to the Vofs, and the source voltage (to be referred to as the Vs hereinafter) thereof is initialized to the power supply voltage Vdd.

At time t3, the write control signal φSel[1] transitions from low level to high level, thereby setting the write transistor 113 in the OFF state. The period from time t2 to time t3 is referred to as a threshold correction period. In the threshold correction period, since the light emission control transistor 114 is turned off, the Vs of the driving transistor 112 changes up to Vofs−Vth as the difference voltage between the voltage Vofs and the threshold voltage (to be referred to as the Vth hereinafter) of the driving transistor 112, and settles. That is, a gate-source voltage Vgs (=Vg−Vs) of the driving transistor 112 changes to the Vth. The threshold voltage Vth is approximately the gate-source voltage Vgs at the time when a current starts to flow through the driving transistor 112. At this time, the gate voltage Vg of the driving transistor 112 is the Vofs. The threshold voltage Vth of the driving transistor 112 is held by the first capacitive element 116.

At time t4, the signal voltage of the signal line VL[1] changes from the voltage Vofs to a signal voltage (to be referred to as a Vsig hereinafter). The Vsig is typically 3 V. At time t5, the write control signal φSel[1] changes from high level to low level. The period from time t3 to time t5 is referred to as a signal write preparation period.

At time t5, since the write transistor 113 is set in the ON state, the gate voltage Vg of the driving transistor 112 changes to the signal voltage Vsig of the signal line VL[1]. Letting C1 be the capacitance of the first capacitive element 116 and C2 be the capacitance of the second capacitive element 117, the source voltage Vs of the driving transistor 112 is expressed by:

$$Vs = Vofs - Vth + C1 * (Vsig - Vofs)/(C1 + C2)$$

At time t6, the write control signal φSel[1] transitions from low level to high level. The period from time t5 to time t6 is referred to as a signal write period.

At time t7, the light emission control signal φSw[1] transitions from high level to low level, thereby setting the light emission control transistor 114 in the ON state. At this time, the source voltage Vs of the driving transistor 112 changes to a voltage substantially equal to the power supply voltage Vdd. In addition, the reset signal φRes[1] transitions from low level to high level, thereby turning off the reset transistor 115. Thus, a current is supplied to the organic light emitting element 111 from the power supply voltage Vdd via the light emission control transistor 114 and the driving transistor 112. With this, the organic light emitting element 111 emits light. The period from time t7 is referred to as a light emission period. On the other hand, the period from time t1 to time t7 is referred to as a non-light emission period. The non-light emission period is changed row-sequentially. That is, the non-light emission period for the pixels 103(2,1) to 103(2,*n*) in the second row starts from time t7.

Figure 4A:
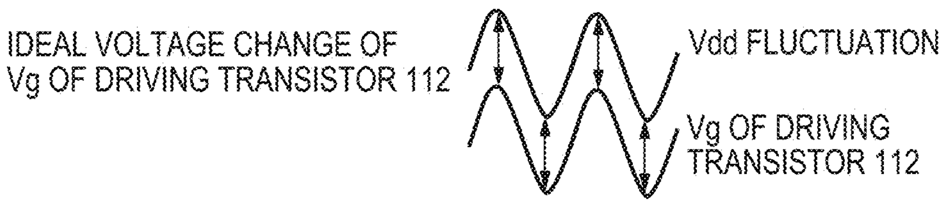
FIGS. 4A to 4C are a view for explaining generation of horizontal stripes.
Figure 4B:
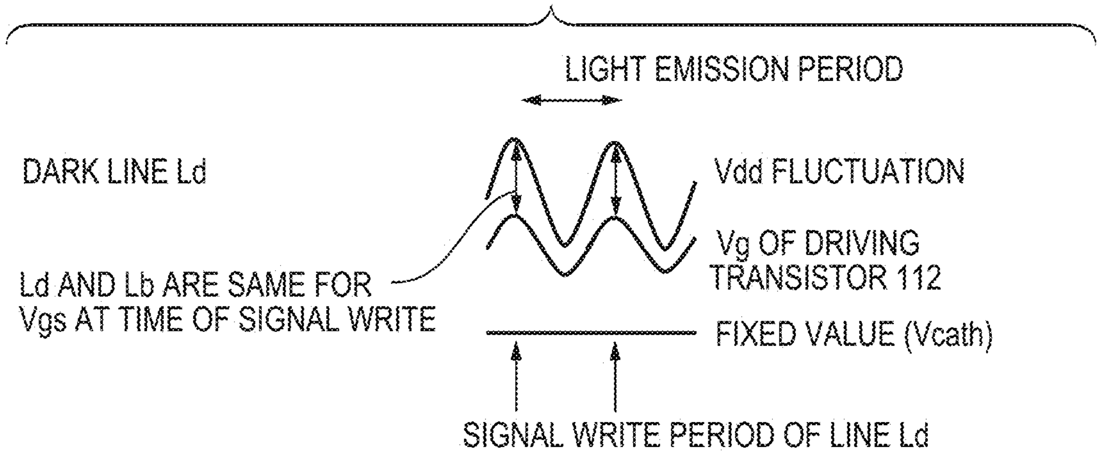
Figure 4C:
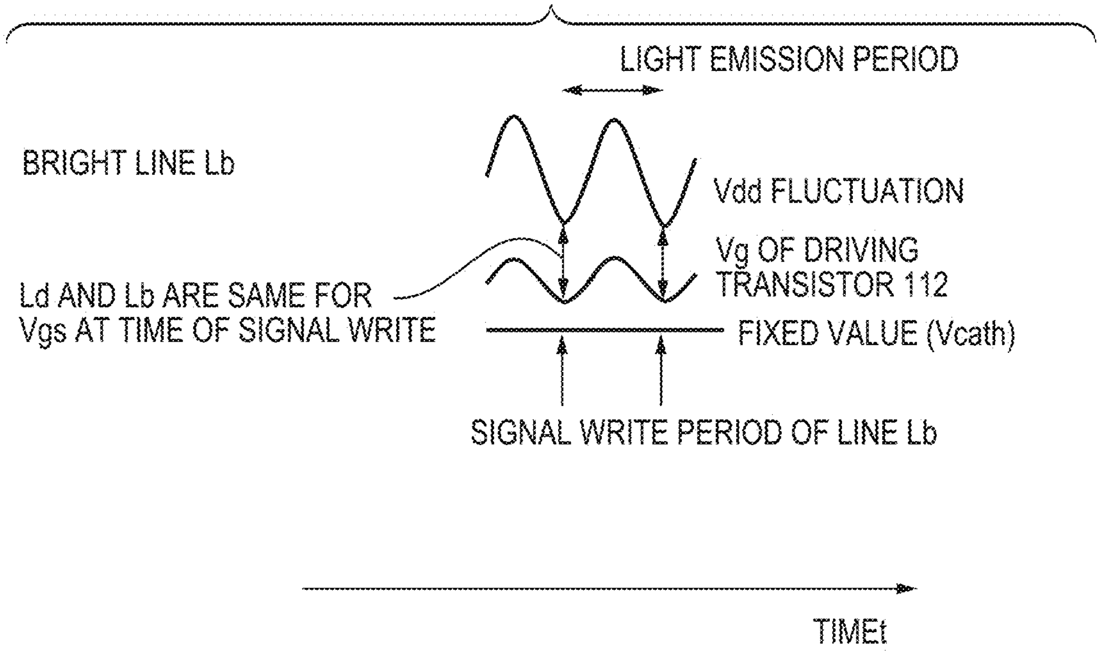

Next, the horizontal stripes generated in the display due to fluctuations of the power supply voltage Vdd will be described with reference to FIGS. 4A to 4C. In FIGS. 4A to 4C, the abscissa represents time t. First, an example (a) of the ideal voltage change of the Vg of the driving transistor 112 will be described in FIG. 4A. The power supply voltage Vdd can fluctuate due to noise from the outside of the light emitting device 101 or noise from the peripheral circuit (the vertical scanning circuit 104, the signal output circuit 105, and the control circuit 106). At this time, it is ideal that the Vg of the driving transistor 112 fluctuates at the same time and same amplitude as the power supply voltage Vdd. Since the source voltage Vs of the driving transistor 112 is the power supply voltage Vdd in the light emission period, the Vgs of the driving transistor 112 is kept constant even if the power supply voltage Vdd fluctuates. If the Vgs is constant, a source-drain current Ids of the driving transistor is constant. For the display at 60 frame per second (fps), the light emission period is, for example, 16 ms, and the non-light emission period is, for example, about 0.02 ms. Since these periods differ by three orders of magnitude, most of the display time is the light emission period. If the capacitances of the first capacitive element 116 and the second capacitive element 117 shown in FIG. 2 are sufficiently large, even if the power supply voltage Vdd fluctuates, the Vgs of the driving transistor 112 is kept constant in the light emission period.

However, the Vg of the driving transistor 112 may not fluctuate at the same time and same amplitude as the power supply voltage Vdd. This will be described using an example (b) of a dark line Ld with a low luminance and an example (c) of a bright line Lb with a high luminance shown in FIGS. 4B and 4C. In the dark line Ld, a signal is written at the positive peak of the fluctuation of the power supply voltage Vdd. Due to the cathode voltage Vcath as a fixed value and the parasitic capacitances 118 and 119 shown in FIG. 2, the Vg of the driving transistor 112 fluctuates at a smaller amplitude than the power supply voltage Vdd. Accordingly, in the dark line Ld, the Vgs of the driving transistor 112 at the negative peak of the fluctuation of the power supply voltage Vdd is smaller than the Vgs in the signal write period. The luminance is proportional to the time integral of the source-drain current Ids of the driving transistor, which is decided by the Vgs. Therefore, in the line Ld, the time integral value of the Ids supplied to the light emitting element 111 is smaller than the ideal one shown in the example (a). Hence, in the line Ld, the luminance can be lower than the ideal luminance.

On the other hand, in the bright line Lb, a signal is written at the negative peak of the fluctuation of the power supply voltage Vdd. Again, due to the cathode voltage Vcath as a fixed value and the parasitic capacitances 118 and 119 shown in FIG. 2, the Vg of the driving transistor 112 fluctuates at a smaller amplitude than the power supply voltage Vdd. Accordingly, in the bright line Lb, the Vgs of the driving transistor 112 at the positive peak of the fluctuation of the power supply voltage Vdd is larger than the Vgs in the signal write period. The luminance is proportional to the time integral of the source-drain current Ids of the driving transistor, which is decided by the Vgs. Therefore, in the line Lb, the time integral value of the Ids supplied to the light emitting element 111 is larger than the ideal one shown in the example (a). Hence, in the line Lb, the luminance is higher than the ideal luminance. In this manner, the line Lb with the higher luminance than the ideal luminance and the line Ld with the lower luminance than the ideal luminance appear in a screen, so that horizontal stripes can be generated in the display.

The presence of the parasitic capacitances 118 and 119 is unavoidable. In order to prevent horizontal stripes in the display even with the parasitic capacitances 118 and 119, it is preferable that the cathode voltage Vcath changes at the same time and same amplitude as the power supply voltage Vdd. To achieve this, the capacitive coupling between the cathode electrode 125 and the power supply wiring 124, to which the power supply voltage Vdd is applied, needs to be strengthened in the pixel array portion 102.

Figure 5:
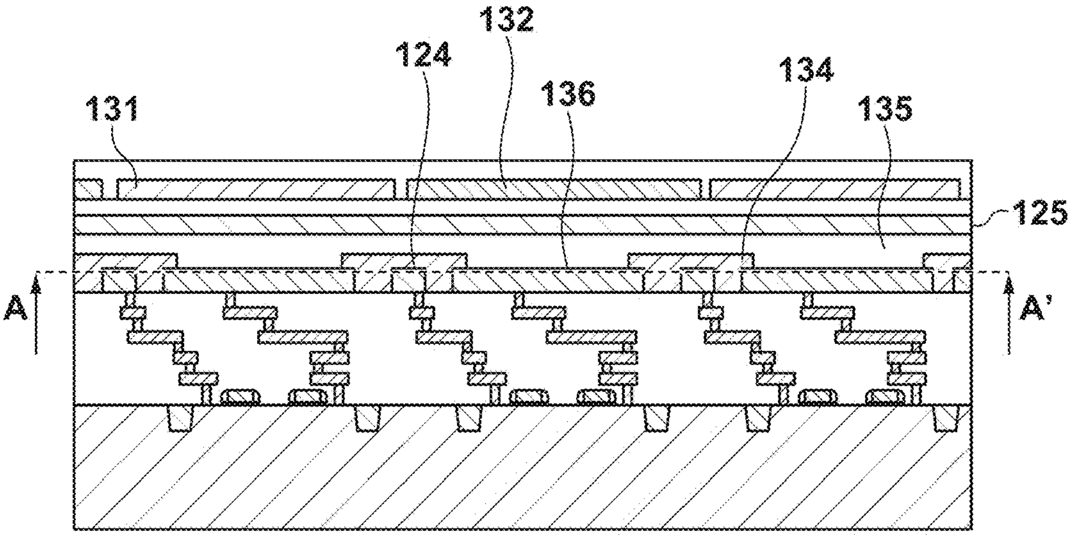
FIG. 5 is a sectional view of a pixel array portion according to the first embodiment.
Figure 6:
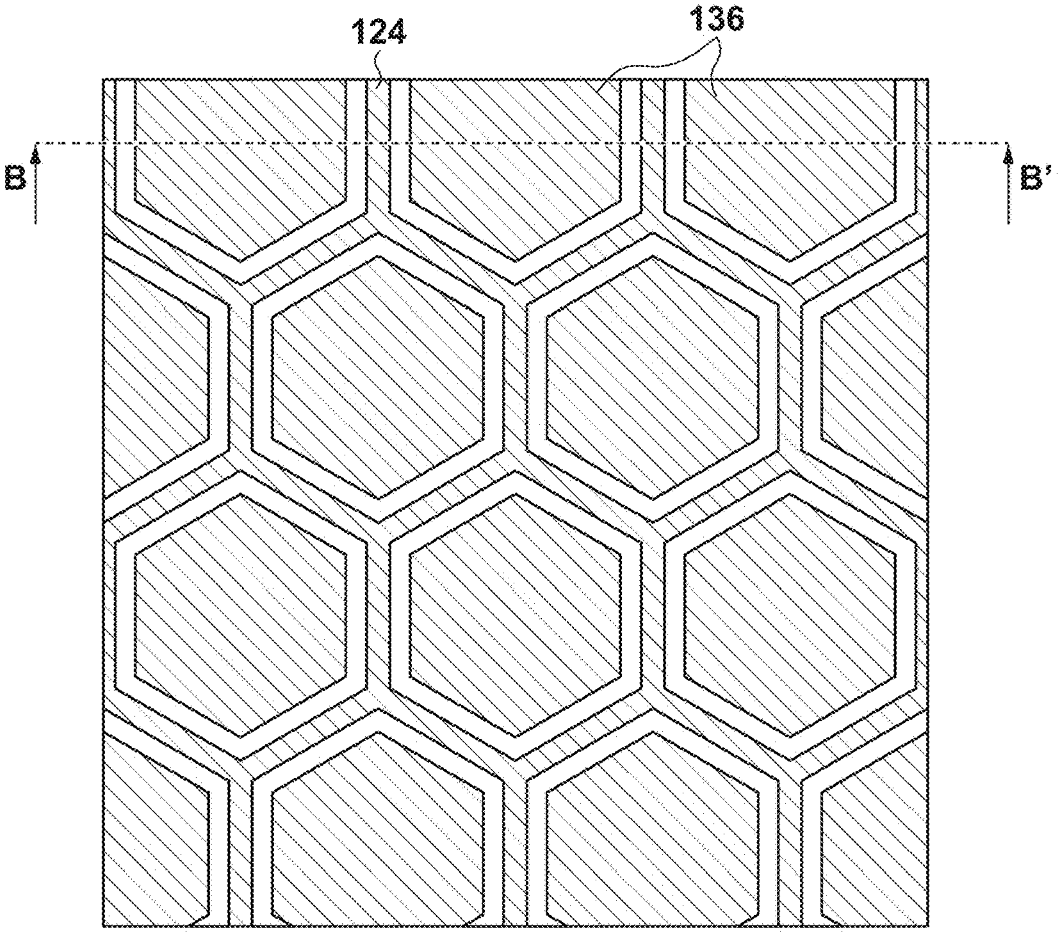
FIG. 6 is a plan view of the pixel array portion according to the first embodiment.

FIGS. 5 and 6 are a sectional view and a plan view, respectively, of the pixel array portion 102 according to this embodiment. FIG. 6 is a view taken along a line A-A' in FIG. 5. FIG. 5 is a view taken along a line B-B' in FIG. 6. In the pixel array portion, a Green color filter 131, a Red color filter 132, a bank 134 between the anode electrodes, an organic layer 135, and anode electrodes 136 can be arranged. Note that the same reference numerals described in the preceding drawings are given to the same components. The organic layer 135 including a light emitting layer is arranged on the anode electrode 136. The cathode electrode 125 common to the plurality of pixels is arranged on the organic layer 135.

As shown in FIG. 5, a part of the power supply wiring 124 is arranged at the same height as the layer including the anode electrode 136 or at the same height as or higher than the bottom surface (the surface of the anode electrode opposite to the side where the cathode electrode is arranged) of the anode electrode 136. In this case, the bank 134 as an insulating region forming an insulating member covers the part of the power supply wiring 124. With this, the part of the power supply wiring 124 is electrically insulated. Since the power supply wiring 124 and the anode electrode 136 are in the same layer, they can be formed by the same photo step. The power supply wiring 124 and the anode electrode 136 are made of the same material, for example, aluminum. The material may be copper. As shown in FIG. 6, the power supply wiring 124 is arranged to thread between the adjacent anode electrodes 136. With this arrangement, strong capacitive coupling can be generated between the power supply wiring 124 and the cathode electrode 125 in the pixel array portion 102. As a result, horizontal stripes generated due to the fluctuation of the power supply voltage Vdd can be reduced. In this embodiment, the anode electrode 136 can have a hexagonal shape to make efficient use of the area.

Note that, to generate capacitive coupling between the power supply wiring 124 and the cathode electrode 125, a method of providing a bypass capacitor outside the light emitting device 101 can also be used. However, if a bypass capacitor is provided outside the light emitting device, inductance components generated in the power supply wiring 124 and the cathode electrode 125 in the pixel array portion 102 increase, so it is not possible to ensure synchronicity between the fluctuation of the power supply voltage Vdd and the fluctuation of the cathode voltage Vcath. Therefore, it is preferable to generate capacitive coupling in the pixel array portion 102.

The voltage of the power supply wiring 124 is higher than the voltage of the anode electrode 136. If the power supply wiring 124 is provided between the anode electrodes 136, this can prevent the drift of holes from the anode electrode 136 side to the power supply wiring 124 side via the hole transport layer, and also has an effect of reducing a crosstalk between pixels caused by signal voltages.

In this embodiment, the anode electrode 136 has a hexagonal shape. However, a rectangle or another shape may also be used. It has been described that the column DAC circuit 108 and the column driver circuit 109 include the DAC circuits and the driver circuits for n columns, respectively, corresponding to the number of columns of the pixel array portion 102. However, by switching with a switch, the number of each of the DAC circuits and the driver circuits can be made smaller than n.

Second Embodiment

Figure 7:
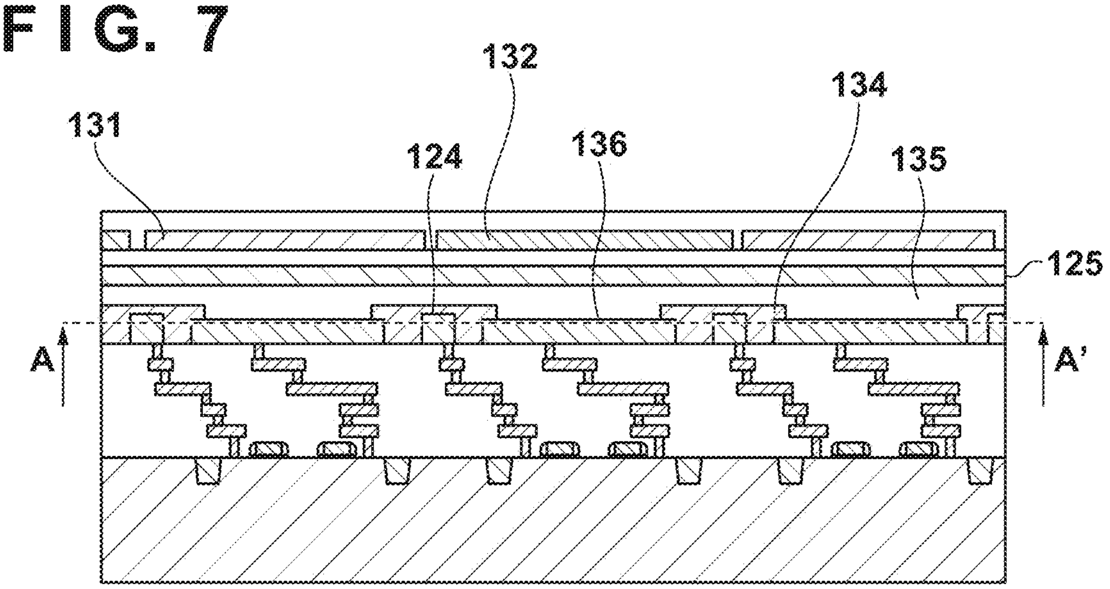
FIG. 7 is a sectional view of a pixel array portion according to the second embodiment.

FIG. 7 is a sectional view of a pixel array portion 102 according to the second embodiment. The same reference numerals described in the preceding drawings are given to the same components. The plan view taken along a line A-A' in FIG. 7 can have a shape similar to that shown in FIG. 6 described in the first embodiment. In this embodiment, as shown in FIG. 7, a power supply wiring 124 is arranged in an upper layer higher than an anode electrode 136, and a bank 134 as an insulating region forming an insulating member covers the power supply wiring 124. With this, a part of the power supply wiring 124 is electrically insulated. In the second embodiment, the power supply wiring 124 and the anode electrode 136 can be formed by different photo steps. In the second embodiment, stronger capacitive coupling can be generated between the power supply wiring 124 and a cathode electrode 125 than in the first embodiment, thereby reducing pixel horizontal stripes. In addition, as in the first embodiment, a crosstalk between pixels based on signal voltages can be reduced.

Third Embodiment

Figure 8A:
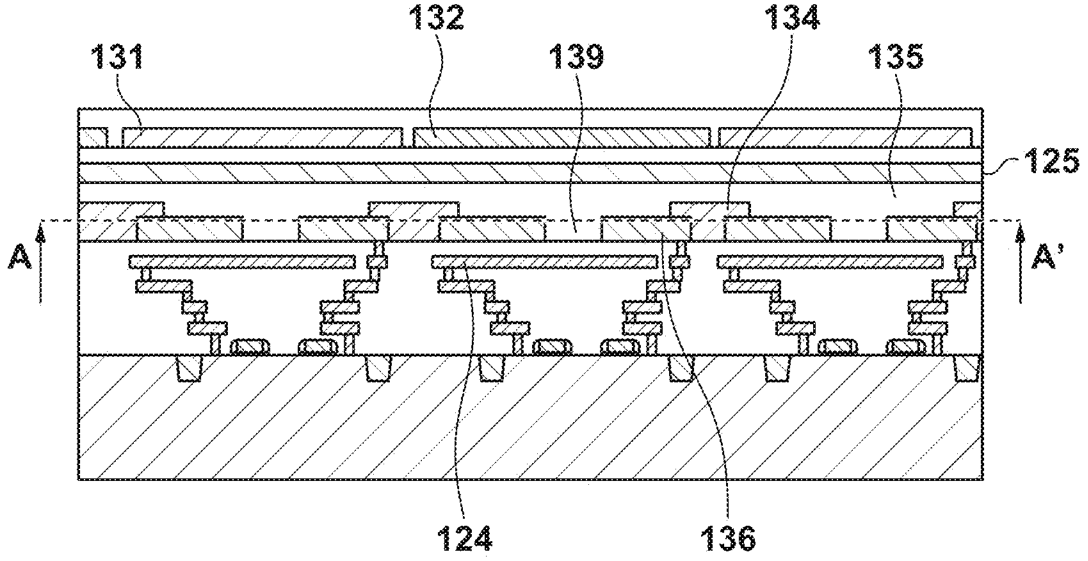
FIG. 8A is a sectional view of a pixel array portion according to the third embodiment.
Figure 8B:
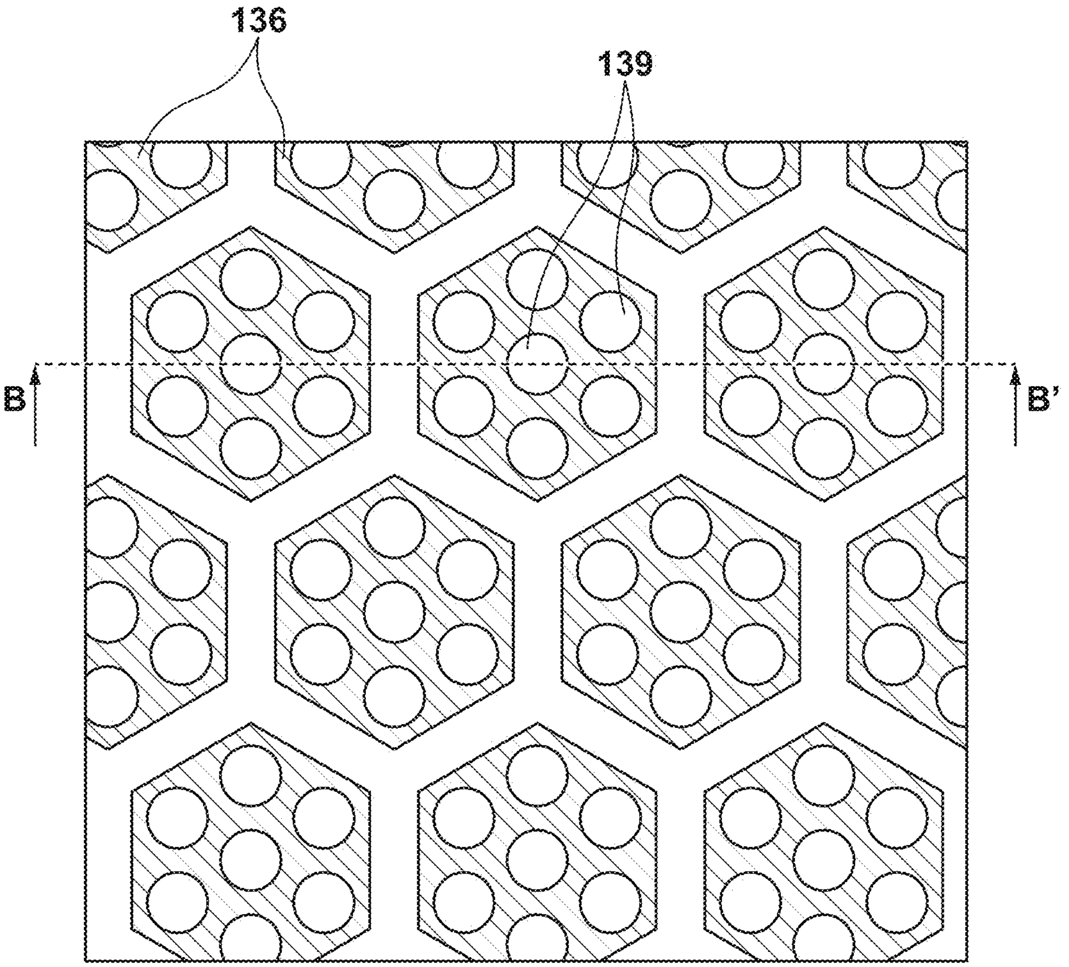
FIG. 8B is a plan view of the pixel array portion according to the third embodiment.

FIGS. 8A and 8B are a sectional view and a plan view, respectively, of a pixel array portion 102 according to the third embodiment. FIG. 8B is a view taken along a line A-A' in FIG. 8A. FIG. 8A is a view taken along a line B-B' in FIG. 8B. In FIGS. 8A and 8B, an opening 139 is provided in an anode electrode 136. The same reference numerals described in the preceding drawings are given to the same components. As shown in the sectional view of FIG. 8A, a power supply wiring 124 is arranged below the opening 139 provided in the anode electrode 136. As a result, a strong capacitive coupling can be generated between the power supply wiring 124 and a cathode electrode 125 facing thereto via the opening 139. As a result, horizontal stripes generated due to the fluctuation of a power supply voltage Vdd can be reduced. The opening 139 can have a circular shape as shown in the plan view of FIG. 8B so that many electric lines of force run from the power supply wiring 124 to the cathode electrode 125 with a minimum area. A plurality of openings 139 may be provided. Alternatively, the anode electrode 136 may have a mesh structure, and the mesh gap may be used as the opening.

(Application Examples of Light Emitting Device)

Figure 9:
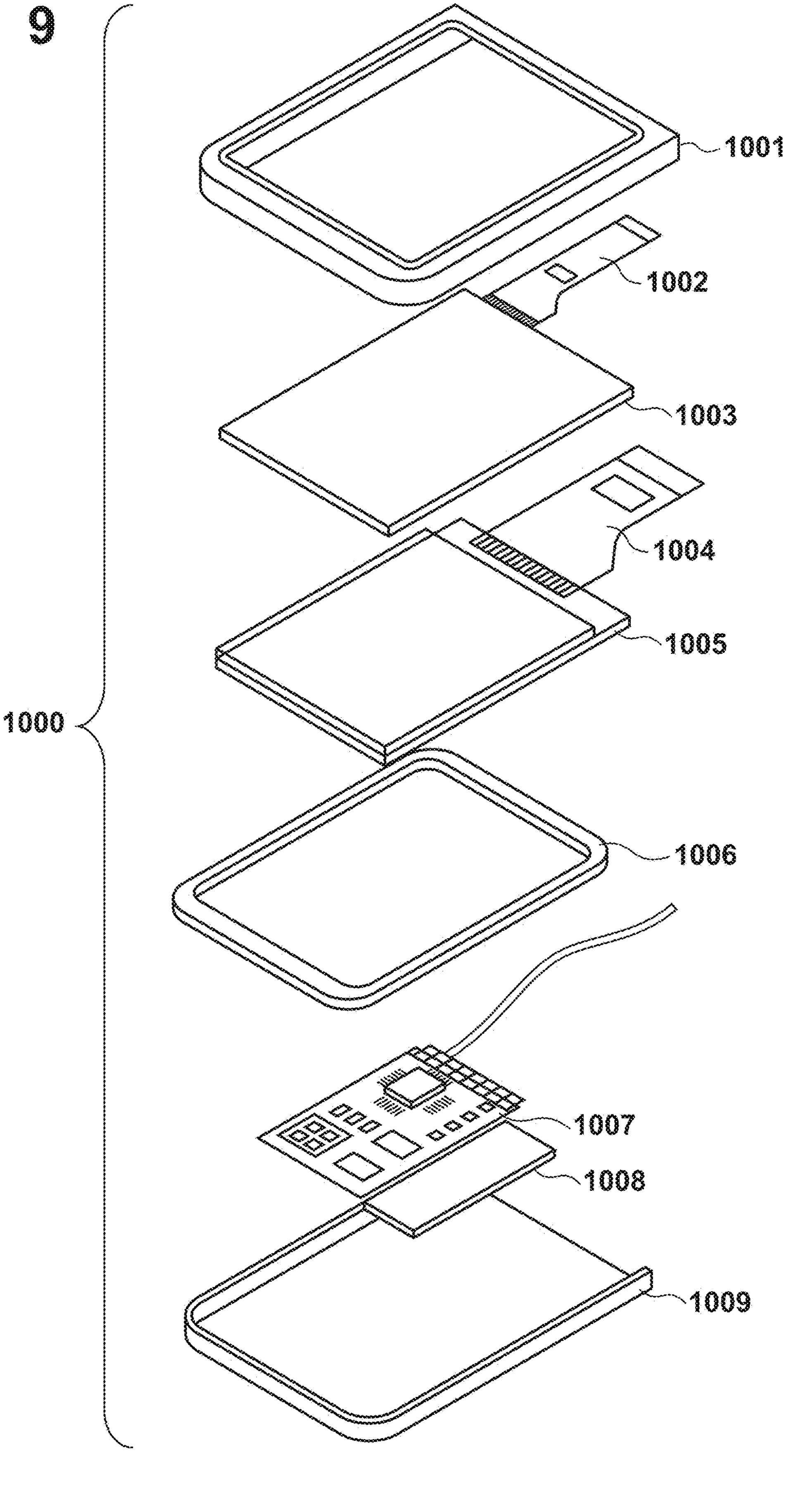
FIG. 9 is a schematic view showing an example of a display device according to an embodiment of the present invention.

Examples in which the light emitting device according to each of the first to third embodiments is applied to an apparatus will be described below. FIG. 9 is a schematic view showing an example of a display device that can use the light emitting device according to each of the above-described first to third embodiments. A display device 1000 can include a touch panel 1003, a display panel 1005, a frame 1006, a circuit board 1007, and a battery 1008 between an upper cover 1001 and a lower cover 1009. Flexible printed circuits (FPCs) 1002 and 1004 can be respectively connected to the touch panel 1003 and the display panel 1005. Transistors are arranged on the circuit board 1007. The battery 1008 is unnecessary if the display device is not a portable apparatus. Even when the display device is a portable apparatus, the battery 1008 may be provided at another position.

The display device according to this embodiment can include color filters of red, green, and blue. The color filters of red, green, and blue can be arranged in a delta array.

The display device according to this embodiment can also be used for a display unit of a portable terminal. At this time, the display unit can have both a display function and an operation function. Examples of the portable terminal are a portable phone such as a smartphone, a tablet, and a head mounted display.

The display device according to this embodiment can be used for a display unit of an image capturing device including an optical unit having a plurality of lenses, and an image capturing element for receiving light having passed through the optical unit. The image capturing device can include a display unit for displaying information acquired by the image capturing element. In addition, the display unit can be either a display unit exposed outside the image capturing device, or a display unit arranged in the finder. The image capturing device can be a digital camera or a digital video camera.

Figure 10A:
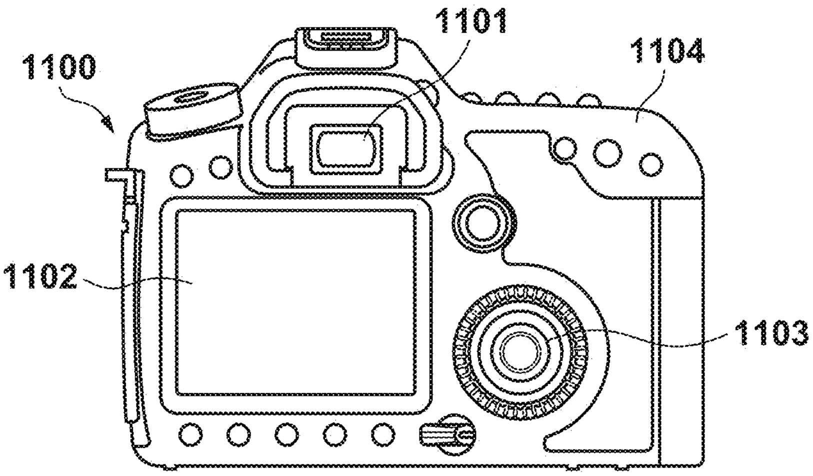
FIG. 10A is a schematic view showing an example of an image capturing device according to an embodiment of the present invention.

FIG. 10A is a schematic view showing an example of an image capturing device using, for a display device, the light emitting device according to each of the first to third embodiments. An image capturing device 1100 can include a viewfinder 1101, a rear display 1102, an operation unit 1103, and a housing 1104. The viewfinder 1101 can include the display device according to this embodiment. In this case, the display device can display not only an image to be captured but also environment information, image capturing instructions, and the like. Examples of the environment information are the intensity and direction of external light, the moving velocity of an object, and the possibility that an object is covered with an obstacle.

The timing suitable for image capturing is a very short time, so the information is preferably displayed as soon as possible. Therefore, the display device preferably uses the light emitting device using an organic light emitting element. This is so because the organic light emitting element has a high response speed. The display device using the organic light emitting element is suitable to be used for the devices that require a high display speed more advantageously than for the liquid crystal display device.

The image capturing device 1100 includes an optical unit (not shown). This optical unit has a plurality of lenses, and forms an image on an image capturing element that is accommodated in the housing 1104. The focal points of the plurality of lenses can be adjusted by adjusting the relative positions. This operation can also automatically be performed. The image capturing device may be called a photoelectric conversion device. Instead of sequentially capturing an image, the photoelectric conversion device can include, as an image capturing method, a method of detecting the difference from a previous image, a method of extracting an image from an always recorded image, or the like.

Figure 10B:
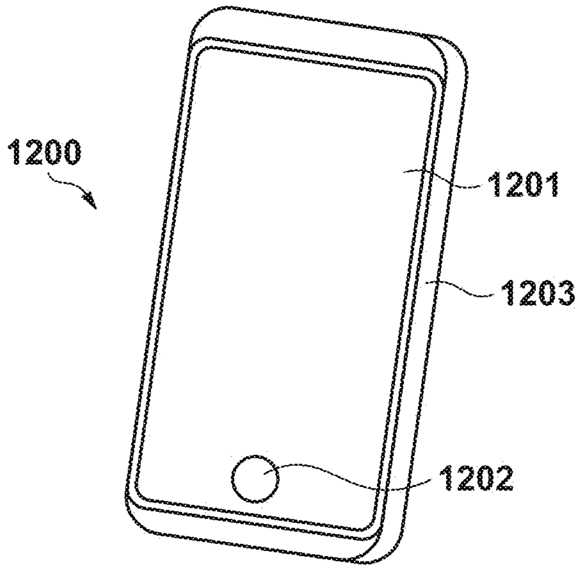
FIG. 10B is a schematic view showing an example of an electronic apparatus according to an embodiment of the present invention.

FIG. 10B is a schematic view showing an example of an electronic apparatus using the light emitting device according to each of the first to third embodiments. An electronic apparatus 1200 includes a display unit 1201, an operation unit 1202, and a housing 1203. The housing 1203 can accommodate a circuit, a printed board having this circuit, a battery, and a communication unit. The operation unit 1202 can be a button or a touch-panel-type reaction unit. The operation unit can also be a biometric authentication unit that performs unlocking or the like by authenticating the fingerprint. The electronic apparatus including the communication unit can also be regarded as a communication apparatus. The electronic apparatus can further have a camera function by including a lens and an image capturing element. An image captured by the camera function is displayed on the display unit. Examples of the electronic apparatus are a smartphone and a notebook computer.

Figure 11A:
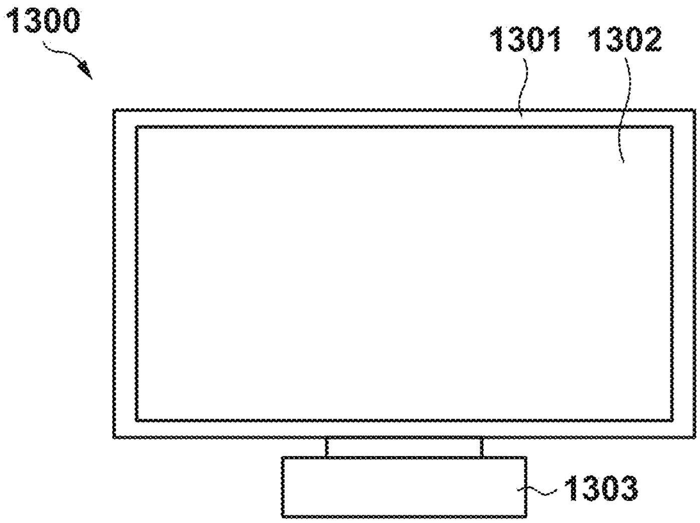
FIG. 11A is a schematic view showing an example of a display device according to an embodiment of the present invention.
Figure 11B:
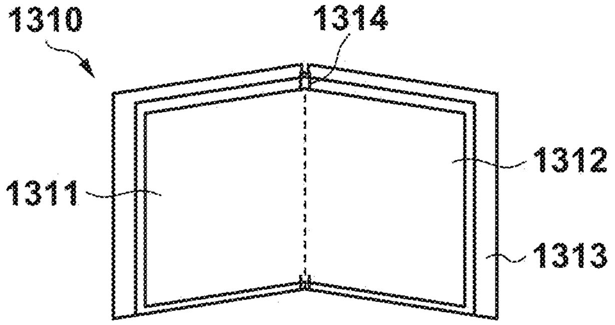
FIG. 11B is a schematic view showing an example of a foldable display device.

FIGS. 11A and 11B are schematic views showing examples of a display device using the light emitting device according to each of the first to third embodiments. FIG. 11A shows a display device such as a television monitor or a PC monitor. A display device 1300 includes a frame 1301 and a display unit 1302. The display unit 1302 may use the light emitting device according to the embodiment.

The display device 1300 includes a base 1303 that supports the frame 1301 and the display unit 1302. The base 1303 is not limited to the form shown in FIG. 11A. The lower side of the frame 1301 may also function as the base.

In addition, the frame 1301 and the display unit 1302 can be bent. The radius of curvature in this case can be 5,000 (inclusive) mm to 6,000 (inclusive) mm.

FIG. 11B is a schematic view showing another example of the display device according to this embodiment. A display device 1310 shown in FIG. 11B can be folded, that is, the display device 1310 is a so-called foldable display device. The display device 1310 includes a first display unit 1311, a second display unit 1312, a housing 1313, and a bending point 1314. The first display unit 1311 and the second display unit 1312 may include the light emitting device according to the embodiment. The first display unit 1311 and the second display unit 1312 can also be one seamless display device. The first display unit 1311 and the second display unit 1312 can be divided by the bending point. The first display unit 1311 and the second display unit 1312 can display different images, and can also display one image together.

Figure 12A:
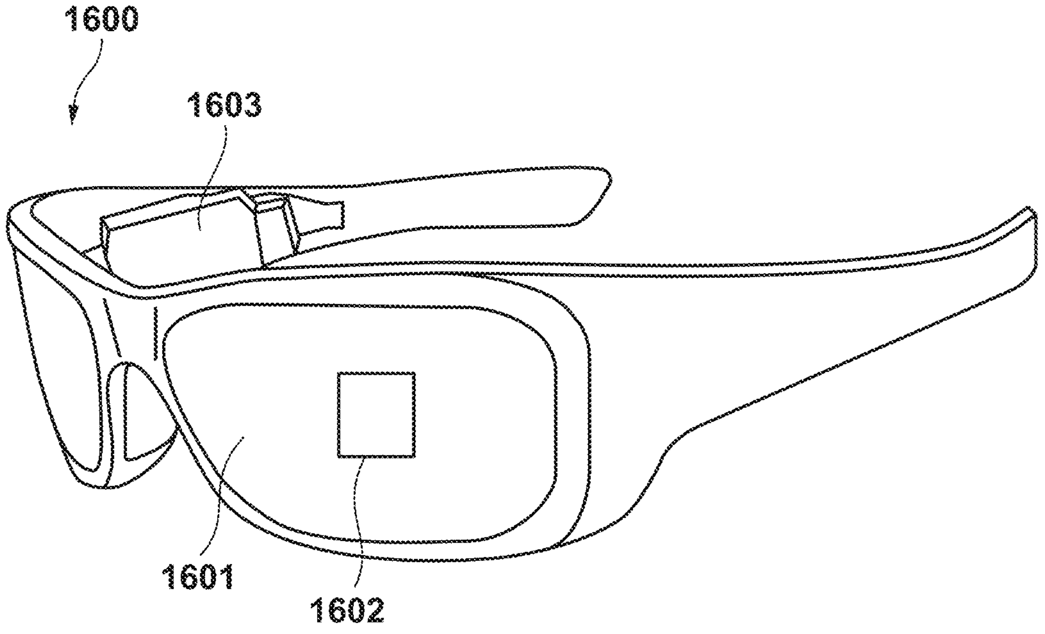
FIG. 12A is a schematic view showing an example of a wearable device according to an embodiment of the present invention.
Figure 12B:
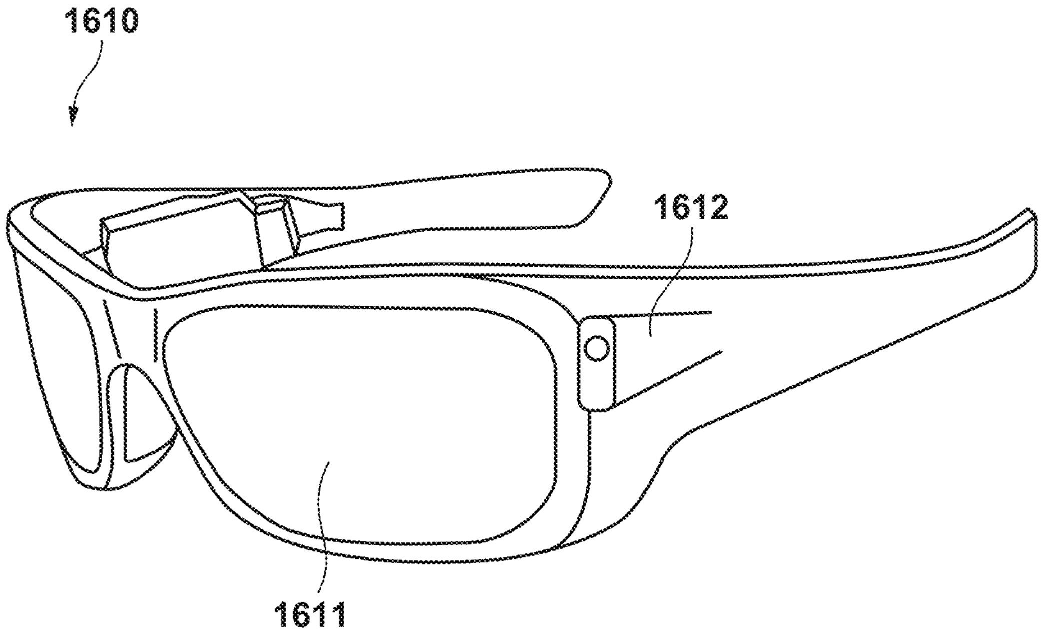
FIG. 12B is a schematic view showing an example of a wearable device according to an embodiment of the present invention and showing a form including an image capturing device.

An example of application of a display device according to an embodiment using the light emitting device according to the above-described embodiment will be described with reference to FIGS. 12A and 12B. The display device can be applied to a system that can be worn as a wearable device such as smartglasses, an HMD, or a smart contact lens. An image capturing display device used for such applications can include an image capturing device capable of photoelectrically converting visible light and a display device capable of emitting visible light.

Glasses 1600 (smartglasses) according to one application example will be described with reference to FIG. 12A. An image capturing device 1602 such as a CMOS sensor or an SPAD is provided on the surface side of a lens 1601 of the glasses 1600. In addition, the display device of each of the above-described embodiments is provided on the back surface side of the lens 1601.

The glasses 1600 can further include a control device 1603. The control device 1603 functions as a power supply that supplies power to the image capturing device 1602 and the display device according to each embodiment. In addition, the control device 1603 controls the operations of the image capturing device 1602 and the display device. An optical system configured to condense light to the image capturing device 1602 is formed on the lens 1601.

Glasses 1610 (smartglasses) according to one application example will be described with reference to FIG. 12B. The glasses 1610 includes a control device 1612. An image capturing device corresponding to the image capturing device 1602 and a display device are mounted on the control device 1612. An optical system configured to project light emitted from the display device in the control device 1612 is formed in a lens 1611, and an image is projected to the lens 1611. The control device 1612 functions as a power supply that supplies power to the image capturing device and the display device, and controls the operations of the image capturing device and the display device. The control device may include a line-of-sight detection unit that detects the line of sight of a wearer. The detection of a line of sight may be done using infrared rays. An infrared ray emitting unit emits infrared rays to an eyeball of the user who is gazing at a displayed image. An image capturing unit including a light receiving element detects reflected light of the emitted infrared rays from the eyeball, thereby obtaining a captured image of the eyeball. A reduction unit for reducing light from the infrared ray emitting unit to the display unit in a planar view is provided, thereby reducing deterioration of image quality.

The line of sight of the user to the displayed image is detected from the captured image of the eyeball obtained by capturing the infrared rays. An arbitrary known method can be applied to the line-of-sight detection using the captured image of the eyeball. As an example, a line-of-sight detection method based on a Purkinje image obtained by reflection of irradiation light by a cornea can be used.

More specifically, line-of-sight detection processing based on a pupil corneal reflection method is performed. Using the pupil corneal reflection method, a line-of-sight vector representing the direction (rotation angle) of the eyeball is calculated based on the image of the pupil and the Purkinje image included in the captured image of the eyeball, thereby detecting the line-of-sight of the user.

The display device according to this embodiment can include an image capturing device including a light receiving element, and a displayed image on the display device can be controlled based on the line-of-sight information of the user from the image capturing device.

More specifically, the display device can decide a first display region at which the user is gazing and a second display region other than the first display region based on the line-of-sight information. The first display region and the second display region may be decided by the control device of the display device, or those decided by an external control device may be received. In the display region of the display device, the display resolution of the first display region may be controlled to be higher than the display resolution of the second display region. That is, the resolution of the second display region may be lower than that of the first display region.

In addition, the display region includes a first display region and a second display region different from the first display region, and a region of higher priority is decided from the first display region and the second display region based on line-of-sight information. The first display region and the second display region may be decided by the control device of the display device, or those decided by an external control device may be received. The resolution of the region of higher priority may be controlled to be higher than the resolution of the region other than the region of higher priority. That is, the resolution of the region of relatively low priority may be low.

Note that Artificial Intelligence (AI) may be used to decide the first display region or the region of higher priority. The AI may be a model configured to estimate the angle of the line of sight and the distance to a target ahead the line of sight from the image of the eyeball using the image of the eyeball and the direction of actual viewing of the eyeball in the image as supervised data. The AI program may be held by the display device, the image capturing device, or an external device. If the external device holds the AI program, it is transmitted to the display device via communication.

When performing display control based on line-of-sight detection, this may be applied to smartglasses further including an image capturing device configured to capture the outside. The smartglasses can display captured outside information in real time.

As has been described above, by using the device using the organic light emitting element according to the embodiment, display with fine image quality and stable even for a long period of time is possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-017430, filed Feb. 7, 2024, which is hereby incorporated by reference herein in its entirety.

What is claimed is:

1. A light emitting device comprising:

a plurality of pixels each including (1) a light emitting element and (2) a driving transistor configured to drive the light emitting element; and a power supply wiring configured to supply a power supply voltage to the driving transistor, wherein the light emitting element includes (1) a first electrode, (2) a light emitting layer arranged on the first electrode, and (3) a second electrode arranged on the light emitting layer, and wherein the first electrode has an opening surrounded by the first electrode, and wherein the power supply wiring faces the second electrode through the opening.

2. The device according to claim 1, wherein the opening includes a plurality of openings provided in the first electrode.

3. The device according to claim 1, wherein a shape of the opening is a circular shape.

4. The device according to claim 1, wherein a shape of the first electrode is a hexagonal shape.

5. The device according to claim 1, wherein at least a part of the power supply wiring is insulated from the second electrode by an insulating member.

6. The device according to claim 1, wherein the driving transistor is connected to the first electrode.

7. The device according to claim 1, wherein the first electrode is an anode electrode, and the second electrode is a cathode electrode.

8. An image capturing device comprising:

an optical unit including a plurality of lenses;

an image capturing element configured to receive light having passed through the optical unit; and a display unit configured to display an image captured by the image capturing element, wherein the display unit includes a light emitting device according to claim 1.

9. A display device comprising:

a display unit including a light emitting device according to claim 1; and a housing provided with the display unit.

10. An electronic apparatus comprising:

a display unit including a light emitting device according to claim 1;

a housing provided with the display unit; and a communication unit provided in the housing and configured to communicate with an outside.

11. A wearable device including:

a display device configured to display an image, wherein the display device includes a light emitting device according to claim 1.

12. The device according to claim 1, further comprising a bank insulating layer covering an edge of the first electrode, wherein a point at which the first electrode contacts with an organic compound layer that includes the light emitting layer does not overlap with the bank insulating layer.

13. The device according to claim 1, wherein the power supply wiring is arranged to face the second electrode over the entire opening in at least one pixel.

* * * * *